United States Patent Office 3,314,967
Patented Apr. 18, 1967

3,314,967
ALPHA PHENYL - BETA - (2-TETRAHYDROFURYL) ALPHA-TERTIARY AMINO ALKYL PROPIONITRILES
Marcel Pesson, Paris, France, assignor to Societe anonyme dite: Laboratoire Roger Bellon, Neuilly-sur-Seine, France, a French company
No Drawing. Filed Oct. 2, 1964, Ser. No. 401,260
Claims priority, application Great Britain, Oct. 4, 1963, 39,261/63
8 Claims. (Cl. 260—294)

This invention relates to α-phenyl-α-(ω-aminoalkyl)-β-(2-tetrahydrofuryl) propionitriles, to processes for their preparation and to pharmaceutical composition containing them.

The present invention provides derivatives of α-phenyl-β-(2-tetrahydrofuryl) propionitrile, and their acid addition salts, of the Formula I:

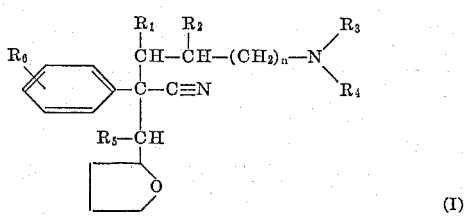

(I)

in which $n$ is 0 or 1; $R_1$ and $R_2$ are the same or different and are hydrogen or lower alkyl, or one of $R_1$ and $R_2$ is hydrogen or lower alkyl and the other forms with $R_3$ or $R_4$ an alkylene chain; $R_3$ and $R_4$ are the same or different substituents and are lower alkyl, or together with the adjacent nitrogen atom, form a saturated mononuclear heterocyclic ring, or one of $R_3$ and $R_4$ is lower alkyl and the other is linked to $R_1$ or $R_2$ as aforesaid; $R_5$ is hydrogen, lower alkyl, cycloalkyl, or aryl; and $R_6$ is hydrogen or halogen, or lower alkyl, lower alkoxy, aryloxy or amino. The lower alkyl hydrocarbon radicals and lower alkoxy groups referred to herein have 1–4 carbon atoms.

Compounds of particular interest are those where $R_1$, $R_2$ and $R_5$ are all hydrogen and $n$ is 0. Preferably also $R_3$ and $R_4$ are both methyl or both ethyl, or together with the adjacent nitrogen constitute a piperidine or morpholine ring. $R_6$ is preferably hydrogen, o-, m- or p-methoxy, p-ethoxy or p-phenoxy.

The compounds of the invention possess anti-tussive properties and thus the invention also comprises pharmaceutical compositions containing a compound according to the invention in the form of the base or its non-toxic acid addition salts, in association with a pharmaceutically acceptable carrier.

According to a feature of the invention, the compounds of Formula I are prepared by reacting an alkali metal derivative of an α-phenyl-β-(2-tetrahydrofuryl) propionitrile of Formula II:

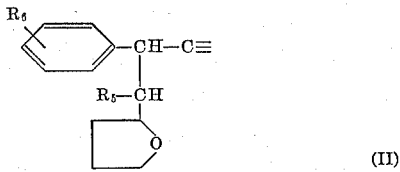

(II)

with a halogenated tertiary amine of Formula IIA:

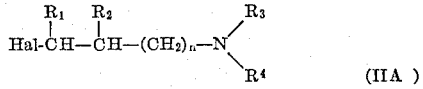

(IIA)

where Hal is a halogen atom, for instance chlorine, and the other symbols have the meanings given above.

The alkali metal derivative, preferably the potassium derivative, can be obtained by the action of the alkali metal amide on the nitriles, for instance in an aromatic non-polar solvent, preferably toluene or xylene. The reaction of compounds II and IIA can conveniently take place in the same solvent at elevated temperature, e.g. the boiling point of the solvent.

When the reaction of compounds II and IIA is completed, the product of Formula I can be extracted from the reaction mixture by a treatment with a dilute solution of a mineral acid. Thereafter, the acid solution is made alkaline by the addition of a strong mineral base, the basic organic products are extracted by means of a suitable solvent, the resulting organic solution is dried, the solvent is driven off and the base of Formula I is purified by distillation under a good vacuum. The reaction products are generally obtained in the form of viscous oils which usually give well-crystallized salts.

The starting nitriles of Formula II can be prepared from the amides of the corresponding α-phenyl-β-2-furyl propionic acids. Thus, the amide of the α-phenyl-β-2-furyl propionic acid of Formula III, hydrogenated under pressure in alcoholic medium at a temperature between 70° C. and 100° C. provides the amide of α-phenyl-β-2-tetrahydrofuryl propionic acid (IV) which, when dehydrated, for instance with p-toluene sulfonyl chloride in pyridine medium, gives the required nitrile (V), as indicated below:

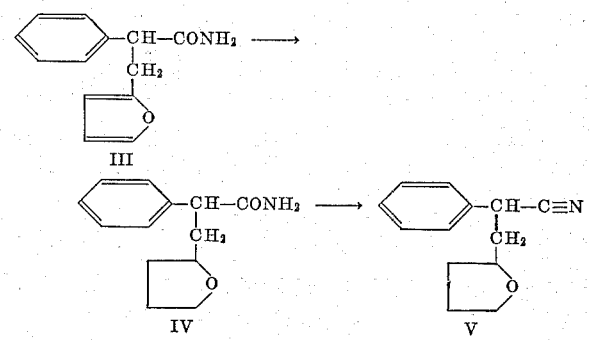

Nitriles of Formula II, especially those having alkoxy or phenoxy substituents on the phenyl radical, can also be obtained by hydrogenation of the corresponding β-2-furyl-acrylonitriles, in alcoholic medium and at normal temperature and pressure, in the presence of a catalyst, for example palladium black. For example when α-(4-methoxyphenyl)-β-(2-furyl)-acrylonitrile of Formula VI is hydrogenated under these conditions, rapid absorption of a volume of hydrogen corresponding substantially to the addition of 3 hydrogen molecules per molecule of acrylonitrile used is observed. It is only towards the end of this absorption that the medium becomes slightly alkaline (indicating reduction of the nitrile group). The product can be isolated by filtering the solution to separate the catalyst, driving off the solvent, taking up the residue in a suitable solvent (for example, diethyl ether), and then extracting the organic solution with a dilute solution of a mineral acid, washing with water and drying. The solvent is evaporated, and the residue is fractionated in vacuo, providing α-(4-methoxyphenyl)-β-(2-tetrahydrofuryl) propionitrile (VII).

The structure of this product is shown by careful alkaline hydrolysis, which leads to the amide (VIII), which is identical with the product obtained by hydrogenation of α-(4-methoxyphenyl)-β-(2-furyl) propionamide (IX) by using Raney nickel. These reactions are set out below:

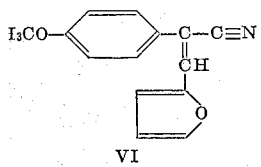

VI

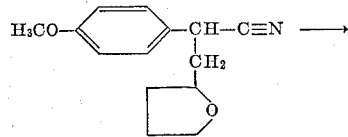

VII

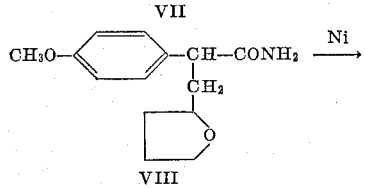

VIII

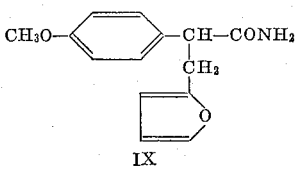

IX

Examples of compounds of Formula II which can be prepared by the catalytic hydrogenation procedure described above are as follows:

(a) α - (4-ethoxyphenyl)-β-(2-tetrahydrofuryl) propionitrile from α-(4-ethoxyphenyl)-β-(2-furyl)-acrylonitrile.

(b) α-(4 - phenoxyphenyl)-β-(2-tetrahydrofuryl) propionitrile from α-(4-phenoxyphenyl)-β-(2-furyl)-acrylonitrile.

(c) α-(2 - methoxyphenyl)-β-(2-tetrahydrofuryl) propionitrile from α-(2-methoxyphenyl)-β-(2-furyl)-acrylonitrile.

(d) α-(3 - methoxyphenyl)-β-(2-tetrahydrofuryl) propionitrile from α-(3-methoxyphenyl)-β-(2-furyl)-acrylonitrile.

The invention is illustrated by the following examples.

*Example I.—α-Phenyl-α-(2-dimethylaminoethyl)-β-(2-tetrahydrofuryl) propionitrile*

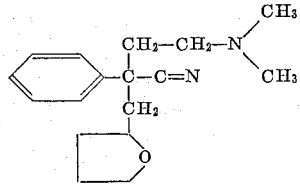

(a) 70 g. of α-phenyl-β-(2-furyl) propionic acid amide dissolved in 250 cc. of ethanol are hydrogenated under a pressure of 50 kg./sq. cm. at 50° C. in the presence of 10 g. of Raney nickel; after cooling, the solution is filtered and the solvent is removed by distillation in vacuo. In order to eliminate the alcohol as completely as possible, the residue is taken up in 400 cc. of benzene, and the solution is distilled in vacuo. The dry residue (which melts at about 131° C.) is dissolved in 200 cc. of pyridine, the mixture is stirred, and then 124 g. of p-toluene sulfonyl chloride are added thereto in small portions. The mixture is then heated for 3 hours under reflux. After cooling, the mixture is taken up in 800 cc. of water, the oily layer is extracted with ether, the ethereal solution is washed with 4 N hydrochloric acid, and then with water, and is dried over magnesium sulphate. After distilling off the solvent, the oily residue is fractionated in vacuo. There is thus obtained α-phenyl-β-(2-tetrahydrofuryl) propionitrile as an oil which boils at 146–149° C./1 mm. Hg.

Analysis of the product shows for $C_{13}H_{15}NO$ (molecular weight=201.26).—Calculated: C=77.58%, H=7.51%, N=6.96%. Found: C=77.02%, H=7.63%, N=6.96%.

(b) In a 2-necked flask equipped with a mechanical stirrer, a reflux condenser and a dropping funnel, a potassium amide suspension is prepared in known manner by adding 2 g. of potassium to 150 cc. of stirred liquid ammonia, the reaction being catalysed by 0.1 g. of ferric nitrate. A solution of 10 g. of the α-phenyl-β-(2-tetrahydrofuryl) propionitrile (obtained as described above in this example) in 100 cc. of toluene is added to the amide suspension by means of the dropping funnel, and the ammonia evolved is removed by gentle heating while stirring.

A solution of 5.35 g. of 2-dimethylamino-1-chloro ethane in 30 cc. of anhydrous toluene is then added through the dropping funnel. The mixture is refluxed for 6 hours, after which the amide which has not reacted is destroyed by adding 20 cc. of ethanol, and the mixture is poured into 300 cc. of iced water. The organic phase is separated by decantation and the aqueous phase is extracted with three successive 100 cc. amounts of ether. The ethereal extracts are recombined with the toluene phase and the mixture is extracted with three successive 200 cc. amounts of 4 N hydrochloric acid. The combined acid solutions are made alkaline by adding sodium hydroxide solution. The oil which is salted out is extracted with ether, the ethereal extracts are washed with water, dried and then the solvent is evaporated on a water bath and the remaining oil is fractionated in vacuo. 7.1 g. (yield 52.1%) of the product are obtained, this being an oil which boils at 142–144° C./0.08 mm. Hg.

Analysis of the product shows for $C_{17}H_{24}N_2O$ (molecular weight 272.38).—Calculated: C=74.96%, H=8.88%, N=10.29%. Found: C=74.70%, H=8.62%, N=9.90%.

The hydrochloride, recrystallized from acetone, melts at 220° C.

*Example II.—α-Phenyl-α-(-2-N-piperidino ethyl)-β-(2-tetrahydrofuryl) propionitrile*

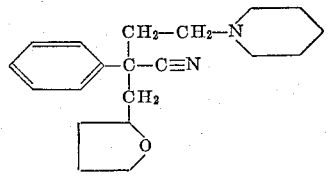

A solution of 10 g. of α-phenyl-β-(2-tetrahydrofuryl) propionitrile in 100 cc. of toluene is added while stirring to potassium amide, prepared by the procedure of Example I, by adding 195 g. of potassium to 150 cc. of liquid ammonia in the presence of 0.1 g. of ferric nitrate. After having removed excess ammonia by gentle heating while stirring, a solution of 7.4 g. of N-2-piperidino-1-chloro ethane in 30 cc. of toluene is poured in and the mixture is heated for 6 hours under reflux while stirring. When the reaction is completed, the product is isolated as described in Example I.

11.1 g. of product are obtained (yield 70.7%), the product being a viscous oil which boils at 174–179° C./0.08 mm. Hg.

Analysis of the product shows for $C_{20}H_{28}N_2O$ (molecular weight 312.44).—Calculated: C=76.88%, H=9.03%, N=8.97%. Found: C=76.26%, H=8.91%, N=9.66%.

The hydrochloride, recrystallized from acetone, melts at 189° C.

Analysis thereof shows.—Calculated: C=68.78%, H=8.31%, N=8.02%, Cl=10.17%. Found: C=68.70%, H=8.20%, N=8.19%, Cl=10.17%.

Example III.—α-phenyl-α-(2-diethylaminoethyl)-β-(2-tetrahydrofuryl) propionitrile

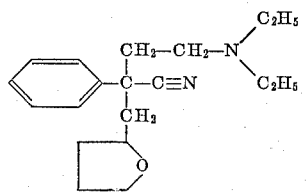

A solution of 20.1 g. of α-phenyl-β-(2-tetrahydrofuryl) propionitrile dissolved in 200 cc. of anhydrous toluene is added while stirring to potassium amide prepared from 3.9 g. of potassium, 250 cc. of liquid ammonia and 0.15 g. of ferric nitrate. After having driven off the evolved ammonia by heating, a solution of 13.5 g. of 2-diethylamino-1-chloro ethane in 70 cc. of anhydrous toluene is added. After heating for 5 hours under reflux, the reaction product is isolated as described in the preceding examples, this product being an oil which boils at 155–159° C./0.09 mm. Hg.

Analysis of the product shows for $C_{19}H_{28}N_2O$ (molecular weight 300.43).—Calculated: C=75.95%, H=9.39%, N=9.33%. Found: C=75.88%, H=9.49%, N=9.13%.

Example IV.—α-phenyl-α-(2-N-morpholyl-ethyl)-β-(2-tetrahydrofuryl) propionitrile

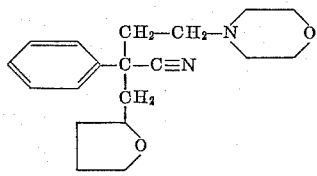

This compound is obtained by the action of 15 g. of N-2-morpholyl-1-chloro ethane on the potassium derivative prepared from 20.1 g. of α-phenyl-β-(2-tetrahydrofuryl) propionitrile using the procedure of Example III. It is an oil which boils at 178–184° C./0.08 mm. Hg.

Analysis of the product shows for $C_{19}H_{26}N_2O_2$ (molecular weight 314.41).—Calculated: C=72.58%, H=8.34%, N=8.91%. Found: C=72.10%, H=8.48%, N=8.74%.

This base gives a well-crystallized acid citrate which melts at 110–112° C. when recrystallized from acetone.

Example V.—α-(4-methoxyphenyl)-α-(2-dimethylaminoethyl)-β-(2-tetrahydrofuryl) propionitrile

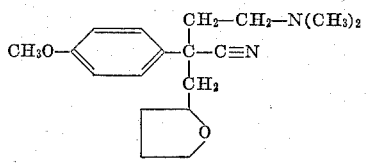

(a) A suspension of 15 g. of α-(4-methoxyphenyl)-β-(2-furyl)-acrylonitrile in 250 cc. of ethanol is hydrogenated at normal pressure (760 mm.) and normal temperature (21° C.) in the presence of 1.5 g. of palladium black previously saturated with hydrogen. The absorption ceases after fixation of about 3 molecules of hydrogen (calculated volume: 4.820 liters; volume consumed: 4.520 liters). The colorless, neutral liquid thus obtained is filtered to separate the catalyst, the solvent is removed on a water bath under a water jet vacuum and the residue is distilled in a good vacuum.

12.5 g. of the reaction product are obtained (yield 81.1%) as an oil which boils at 156° C./0.6 mm. Hg.

Analysis of the product shows for $C_{14}H_{17}NO_2$ (molecular weight 231.28).—Calculated: C=72.70%, H=7.41%, N=6.06%, $CH_3O$=13.40%. Found: C=73.15%, H=7.16%, N=5.92%, $CH_3$=13.30%.

By saponification effected by means of potassium hydroxide solution in alcohol, the product gives an amide which melts at 187° C. The same amide can be obtained by hydrogenation of α-(4-methoxyphenyl)-β-(2-furyl) propionamide in the presence of Raney nickel at 80° C. under a hydrogen pressure of 50 kg./sq. cm.

The acrylonitrile used in this example was obtained by condensation of furfural with 4-methoxyphenyl acetonitrile in alcoholic medium in the presence of sodium hydroxide. It is a solid which melts at 62° C. when recrystallized from cyclohexane.

Analysis of the product shows, for $C_{14}H_{11}NO_2$ (molecular weight 225.24).—Calculated: C=74.65%, H=4.92%, N=6.22%, $CH_3O$=13.76%. Found: C=75.00%, H=5.01%, N=6.19%, $CH_3O$=13.63%.

(b) 20 g. of α-(4-methoxyphenyl)-β-(2-tetrahydrofuryl) propionitrile, prepared as in (a) above, is converted into the potassium derivative by the procedure described above using potassium amide prepared from 3.4 g. of potassium. After extraction and distillation, there are obtained 18.6 g. (yield 71.5%) of an oil which boils at 155–157° C./0.06 mm. Hg.

Analysis of the product shows for $C_{18}H_{26}N_2O_2$ (molecular weight 302.4).—Calculated: C=71.49%, H=8.67%, N=9.26%. Found: C=71.07%, H=8.63%, N=9.17%.

The hydrochloride thereof melts at 202–203° C.

Example VI.—α(4-methoxyphenyl)-α-(2-N-piperidyl ethyl)-β-(2-tetrahydrofuryl)propionitrile

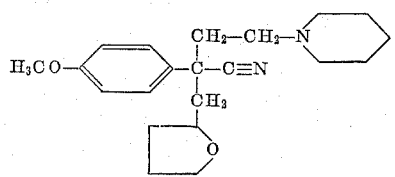

This product was obtained by following the procedure of the preceding example, by the action of 2-N-piperidyl-1-chloroethane on the potassium derivative of α-(4-methoxy)-β-(2-tetrahydrofuryl) propionitrile. It is an oil which boils at 187° C./0.08 mm. Hg.

Analysis of the product shows for $C_{21}H_{30}N_2O_2$ (molecular weight 342.47).—Calculated: C=73.64%, H=8.83%, N=8.18%, $CH_3O$=9.05%. Found: C=73.41%, H=8.86%, N=8.00%, $CH_3O$=9.17%.

The hydrochloride thereof melts at 188–189° C. on being recrystallized from acetone.

Example VII.—α-(4-ethoxyphenyl)-α-(2-dimethylaminoethyl)-β-(2-tetrahydrofuryl)propionitrile

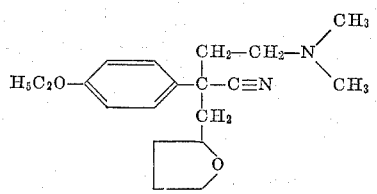

(a) 20.5 g. of α-(4-ethoxyphenyl)-β-(2-furyl)-acrylonitrile in suspension in 350 cc. of absolute ethanol are hydrogenated at normal pressure (750 mm.) and normal temperature (20° C.). The hydrogen absorption ceases after absorption of about 3 molecules of hydrogen (calculated volume: 6.175 liters; volume consumed: 6.180 liters. The solution is filtered, and the solvent is removed on a water bath under water jet vacuum. The remaining oil is dissolved in ether and the organic solution is treated with a 2.5 N hydrochloric acid solution (for removing basic impurities), is washed with water and then dried over magnesium sulfate; the solvent is distilled and the residue is fractionated in a good vacuum. There are thus obtained 17.2 g. (yield 82.9%) of α-(4-ethoxyphenyl)-β-(2-tetrahydrofuryl) propionitrile, as an oil which boils at 158–162° C./0.08 mm. Hg.

Analysis of the product shows for $C_{15}H_{19}NO_2$ (molecular weight 245.31).—Calculated: C=73.44%, H=7.81%, N=5.71%, $C_2H_5O$=18.34%. Found: C=73.93%, H=7.73%, N=5.74%, $C_2H_5O$=18.40%.

The α-(4-ethoxyphenyl)-β-(2-furyl)-acrylonitrile necessary for this reaction was obtained by the action of furfural on 4-ethoxyphenylacetonitrile in alcoholic solution in the presence of potassium hydroxide. It is a solid which melts at 74° C. when recrystallized from cyclohexane.

The analysis of the product shows for $C_{15}H_{13}NO_2$ (molecular weight 239.26).—Calculated: C=75.30%, H=5.48%, N=5.85%, $C_2H_5O$=18.81%. Found: C=75.51%, H=5.70%, N=5.79%, $C_2H_5O$=18.79%.

(b) 24.5 g. of α-(4-ethoxyphenyl)-β-(2-tetrahydrofuryl) propionitrile are converted into the potassium derivative in toluene solution by following the procedure described above by means of potassium amide prepared from 3.9 g. of potassium; thereafter, a solution of 10.7 g. of 2-dimethylamino-1-chloroethane in 70 cc. of toluene is added. After the reaction 20.8 g. of product (yield 55.8%) are isolated by the procedure described hereinabove. It is an oil which boils at 152–156° C./0.03 mm. Hg.

Analysis of the product shows for $C_{19}H_{28}N_2O_2$ (molecular weight 316.43).—Calculated: C=72.11%, H=8.92%, N=8.85%. Found: C=71.76%, H=8.87%, N=8.68%.

The hydrochloride melts at 170–173° C. on recrystallization from acetone.

*Example VIII.*—α-(4-ethoxyphenyl)-α-(2-N-piperidylethyl)-β-(2-tetrahydrofuryl)propionitrile

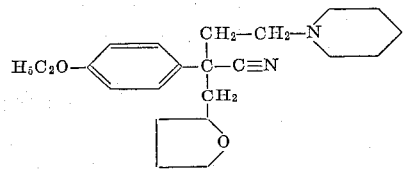

This base was prepared by following the procedure described in the preceding examples by the action of 14.7 g. of 2-N-piperidyl-1-chloroethane on 24.5 g. of α-(4-ethoxyphenyl)-β-(2-tetrahydrofuryl) propionitrile previously converted into the potassium derivative in toluene solution. 25.9 g. of the reaction product (yield 72.8%) are obtained; this product is an oil which boils at 178–180° C./0.05 mm. Hg.

Analysis of the product shows for $C_{22}H_{32}N_2O_2$ (molecular weight 356.49).—Calculated: C=74.12%, H=9.05%, N=7.86%. Found: C=74.50%, H=8.97%, N=7.70%.

The hydrochloride melts at 198–202° C. when recrystallized from acetone.

*Example IX.*—α-(4-phenoxyphenyl)-α-(2-dimethylaminoethyl)-β-(2-tetrahydrofuryl)propionitrile

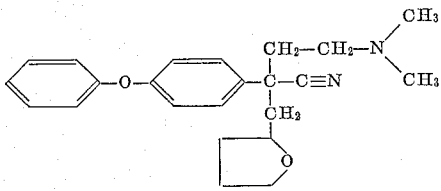

(a) A suspension of 10.3 g. of α-(4-phenoxyphenyl-β-(2-furyl)-acrylonitrile in 170 cc. of ethanol is hydrogenated in the presence of 1 g. of 5% palladium black at normal pressure (750 mm.) and normal temperature (22° C.). The absorption ceases after fixation of about 3 molecules of hydrogen (volume calculated: 2.578 liters; volume consumed: 2.555 liters). The nitrile is isolated as described in the preceding examples and 8.3 g. thereof are obtained (yield 61.9%), the product being an oil boiling at 180–183° C./0.03 mm. Hg.

Analysis of the product shows for $C_{19}H_{13}NO_2$ (molecular weight 287.30).—Calculated: C=79.43%, H=4.56%, N=4.88%. Found: C=79.73%, H=4.67%, N=4.59%.

Saponification of the product with alcoholic potassium hydroxide solution leads to an amide which, when recrystallized from ethanol, melts at 157–158° C. It is identical with the amide obtained by reduction of α-(4-phenoxyphenyl)-β-(2-furyl) propionamide (M.P. 110° C.) by means of Raney nickel at 80° C. under a hydrogen pressure of 60 kg./sq. cm.

The α-(4-phenoxyphenyl)-β-(2-furyl)-acrylonitrile used in this example was obtained by the action of furfural on 4-phenoxyphenyl acetonitrile in alcoholic solution in the presence of sodium hydroxide solution. Recrystallized from ethanol it melts at 80° C.

Analysis of the product shows, for $C_{19}H_{13}NO_2$ (molecular weight 287.30).—Calculated: C=79.43%, H=4.56%, N=4.88%. Found: C=79.73%, H=4.67%, N=4.85%.

(b) 20 g. of α-(4-phenoxyphenyl)-β-(2-tetrahydrofuryl) propionitrile, prepared as described under (a) above, are transformed into a potassium derivative by the action, in toluene, of the amide prepared from 2.6 g. of potassium; said compound is then alkylated with 7.3 g. of 2-dimethylamino-1-chloro ethane. When the reaction is completed, the reaction product is extracted and purified as described in the preceding examples, and 15.6 g. are obtained (yield 62.5%). This is an oil boiling at 190–201° C./0.06 mm. Hg.

Analysis of the product shows, for $C_{23}H_{18}N_2O_2$ (molecular weight 364.47).—Calculated: C=75.79%, H=7.74%, N=7.69%. Found: C=75.76%, H=7.63%, N=7.49%.

The hydrochloride recrystallized from ethyl acetate, melts at 145° C. with decomposition.

*Example X.*—α-(4-phenoxyphenyl)-α-(2-N-piperidylethyl)-β-(2-tetrahydrofuryl) propionitrile

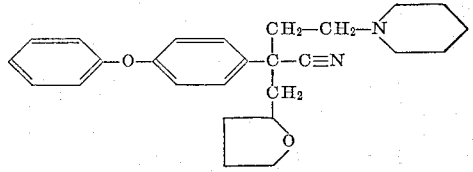

This base is obtained by using the procedure of the preceding example by the action of 2-N-piperidino-1-chloro ethane on α-(4-phenoxyphenyl)-β-(2-tetrahydrofuryl) propionitrile. The product is an oil which boils at 216–225° C./0.04 mm. Hg. The analysis for $C_{26}H_{32}N_2O_2$ (molecular weight 404.53) shows.—Calculated: C=77.19%; H=7.97, N=6.93. Found: C=77.21%, H=7.70%, N=6.66%.

*Example XI.*—α-(4-phenoxyphenyl)-α-(2-N-morpholylethyl)-β-(2-tetrahydrofuryl) propionitrile

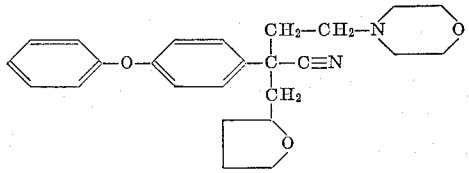

The compound was prepared by alkylation of α-(4-phenoxyphenyl)-β-(2-tetrahydrofuryl) propionitrile with 2-N-morpholyl-1-chloro ethane. It is an oil boiling at 240–248° C./0.07 mm. Hg.

Analysis of the product shows for $C_{25}H_{30}N_2O_3$ (molecular weight 406.51).—Calculated: C=73.86%, H=7.44%, N=6.89%. Found: C=73.45%, H=7.44%, N=7.04%.

Its hydrochloride melts at 194–196° C.

Example XII.—α-(2-methoxyphenyl)-α-(2-dimethylaminoethyl)-β-(2-tetrahydrofuryl) propionitrile

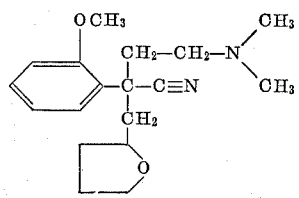

(a) A solution of 22.5 g. of α-(2-methoxyphenyl)-β-(2-furyl)-acrylonitrile in 100 cc. of ethanol is hydrogenated at normal pressure (765 mm.) and normal temperature (20° C.) in the presence of 8 g. of 5% palladium black previously saturated in the presence of hydrogen. (The volume of hydrogen absorbed is 7.200 liters; the volume calculated for 3 molecules is 6.810 liters.)

The solution is filtered, the solvent is driven off in vacuo, the oily residue is extracted with ether, the solution is washed with 2 N hydrochloric acid and then with water and dried over magnesium sulfate. The solvent is evaporated on a water bath and the oily residue is fractionated in vacuo: there is thus obtained α-(2-methoxyphenyl)-β-(2-tetrahydrofuryl) propionitrile, which is an oil boiling at 133° C./0.3 mm. Hg.

Analysis of the product shows for $C_{14}H_{17}NO_2$ (molecular weight 231.28).—Calculated: C=72.7%, H=7.41%, N=6.06%. Found: C=72.65%, H=7.39%, N=5.97%.

By saponification of the product with alcoholic potassium hydroxide, there is obtained an amide (M.P.=108° C.) which is identical with the product obtained by catalytic hydrogenation with Raney nickel of α-(2-methoxyphenyl)-α-(2-furyl) propionitrile.

(b) To the potassium amide prepared from 4 g. of potassium, 300 cc. of liquid ammonia and 0.1 g. of ferric nitrate, there is added in accordance with the preceding examples 23.1 g. of α-(2-methoxyphenyl)-β-(2-tetrahydrofuryl) propionitrile dissolved in 100 cc. of toluene. After evaporating excess ammonia, a solution of 10.8 g. of 2-dimethylamino-1-chloro ethane in 75 cc. of toluene is added. After heating the mixture for 8 hours under reflux, the α-(2-methoxyphenyl)-α-(2-dimethylaminoethyl)-β-(2-tetrahydrofuryl) propionitrile is extracted as described in the preceding examples; it is an oil boiling at 148° C./0.06 mm. Hg.

Analysis of the product shows for $C_{18}H_{26}N_2O_2$.—Calculated: C=71.49%, H=8.67%, N=9.26%. Found: C=71.35%, H=8.54%, N=9.32%.

On standing, the product crystallizes (M.P.=76° C.).

The hydrochloride, recrystallized from ethyl acetate, melts at 142° C.

Example XIII.—α-(2-methoxyphenyl)-α-(2-N-piperidylethyl)-β-(2-tetrahydrofuryl) propionitrile

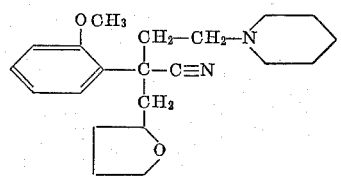

This compound is obtained by following the procedure of Example XII by the action of 2-N-piperidino-1-chloro ethane on the potassium derivative of α-(2-methoxyphenyl)-β-(2-tetrahydrofuryl) propionitrile; it constitutes an oil, boiling at 160° C./0.003 mm. Hg.

Analysis of the product shows for $C_{21}H_{30}N_2O_2$ (molecular weight 342.47).—Calculated: C=73.64%, H=8.83%, N=8.18%. Found: C=73.38%, H=8.68%, N=8.02%.

Example XIV.—α-(3-methoxyphenyl)-α-(2-N-dimethylaminoethyl)-β-(2-tetrahydrofuryl) propionitrile

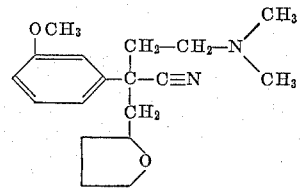

(a) 22.5 g. of α-(3-methoxyphenyl)-β-furyl-acrylonitrile in solution in 75 cc. of alcohol are hydrogenated as described in the preceding examples in the presence of 5% palladium black at normal pressure (760 mm.) and normal temperature (22° C.) (volume absorbed: 7.075 cc.; volume calculated for 3 molecules 7.200 cc.).

After filtration, the solvent is eliminated by vacuum distillation on a water bath. The remaining oil is extracted with ether, the organic solution is washed by decantation with 2.5 N hydrochloric acid, then with water, and then dried over magnesium sulfate. After eliminating the solvent, the remaining oil is fractionated in vacuo. It boils at 122° C./0.3 mm. Hg.

Analysis of the product shows for $C_{14}H_{17}NO_2$ (molecular weight 231.28). Calculated: C=72.70%, H=7.41%, N=6.06%. Found: C=73.03%, H=7.20%, N=5.97%.

Controlled saponification of this product with alcoholic potassium hydroxide solution yields an amide which, when recrystallized from benzene, melts at 138° C.; it is identical with that obtained by catalytic hydrogenation of α-(3-methoxyphenyl)-β-(2-furyl) propionamide under pressure (70 kg./sq. cm.) at a temperature of 65° C.

(b) 13.3 g. of α-(3-methoxyphenyl)-β-(2-tetrahydrofuryl) propionitrile in solution in 50 cc. of anhydrous toluene are transformed as described in the preceding examples into the potassium derivative by the action of potassium amide prepared from 2.3 g. of potassium. 6.2 g. of 2-dimethylamino-1-chloro ethane dissolved in 50 cc. of anhydrous toluene are then added and the mixture is heated for 7 hours under reflux. The reaction product is isolated and purified as described in the previous examples. It is a viscous oil, boiling at 144° C./0.04 mm. Hg.

Analysis of the product shows for $C_{18}H_{26}N_2O_2$ (molecular weight 302.4).—Calculated: C=71.49%, H=8.67%, N=9.26%. Found: C=71.22%, H=8.60%, N=9.10%.

The hydrochloride melts at 190° C.

The pharmacodynamic activity of the compounds described above, in the form of their hydrochlorides, was investigated.

The toxicity of the compounds was first of all studied by determining the $LD_{50}$ for mice by intravenous application. The $LD_{50}$ values obtained are shown in Table 1 below:

TABLE 1

| Product of Example No.: | $LD_{50}$ (mg./kg.) |
|---|---|
| I | 110 |
| II | 67 |
| III | 62 |
| IV | 220 |
| V | 90 |
| VI | 60 |
| VII | 75 |
| VIII | 55 |
| IX | 45 |
| X | 50 |
| XI | 65 |
| XIII | 35 |
| XIV | 72 |

The anti-tussive activity of the hydrochlorides of the examples was investigated as follows:

(a) The first test was the test using electrical stimulation of the superior laryngeal nerve of a cat (Domenjoz technique). A cat is anaesthetized by intraperitoneal injection of 25 mg./kg. of Nembutal and its superior laryngeal nerves are carefully dissected. Using a stimulator, there is then produced an electrical excitation at the rate of 5 to 10 per second for 5 to 10 seconds, the excitations (0.5 to 1 volt) being repeated during periods of at least two minutes. The movements of the abdominal region corresponding to the respiration and the coughing attacks were recorded by a Marey device. The value of an administered anti-tussive substance is evaluated by observing the disappearance of these phenomena.

Table 2 below gives the doses effective in the total suppression of the attacks of coughing.

TABLE 2

| Example No.: | Dose (mg.) |
|---|---|
| I | 5 |
| II | 10 |
| III | 5 |
| IV | >20 |
| V | 5 |
| VI | 5 |
| VII | 5 |
| VIII | >5 |
| IX | >5 |
| X | 5 |
| XI | 5 |
| XIII | 5 |
| XIV | 5 |

(b) The second test was that comprising mechanical excitation of the trachea of a guinea pig.

Guinea pigs are anaesthetized by intraperitoneal injection of 25 mg./kg. of Nembutal. A tracheotomia was then carried out and the tracheal epithelium was directly excited mechanically by means of a hair. The dose of substance which makes it possible to prevent the occurrence of fits of coughing is established with respect to the different compounds which are tested, and Table 3 indicates the necessary doses found with respect to said compounds.

TABLE 3

| Example No.: | Dose (mg.) |
|---|---|
| I | 5 |
| V | 5 |
| VI | 5 |
| VII | >10 |
| X | 5 |
| XIII | >5 |
| XIV | 5 |

The spasmolytic activity of the hydrochlorides of the examples was assessed as follows. In the duodenum of a rat, placed in a Tyrode solution oxygenated at 37° C., a spasm is caused, either by administering acetyl choline in a concentration of about $10^{-7}$ or barium chloride in a concentration of $10^{-4}$. After washing, attempts were made to prevent the occurrence of new spasms by the addition of the substance to be investigated.

Table 4 below gives the concentrations of the tested compounds which are required to reduce by half the spasms initiated by the one or the other spasmogenic compound.

TABLE 4

| Example No. | Concentration of Test Compound | |
|---|---|---|
| | Acetyl choline | BaCl$_2$ |
| I | $1.5 \times 10^{-6}$ | $1.5 \times 10^{-5}$ |
| II | $1.5 \times 10^{-6}$ | $1.5 \times 10^{-5}$ |
| III | $1 \times 10^{-7}$ | $1.10^{-7}$ |
| VI | $5 \times 10^{-6}$ | $6.10^{-6}$ |
| VII | $1 \times 10^{-5}$ | $3 \times 10^{-5}$ |
| VIII | $5 \times 10^{-6}$ | $6 \times 10^{-6}$ |
| X | $2.10^{-6}$ | $6 \times 10^{-6}$ |
| XI | $1.5 \times 10^{-5}$ | $3 \times 10^{-6}$ |
| XIII | $6 \times 10^{-7}$ | $3.10^{-7}$ |
| XIV | $5 \times 10^{-6}$ | $6.10^{-6}$ |

From an examination of the above tables, it is clear that a certain number of compounds have marked anti-tussive properties; and it appears that these properties depend on the nature of the substituents carried by the aromatic ring. Moreover, they have appreciable spasmolytic properties.

The compound of Example I in particular shows marked anti-tussive properties with a low toxicity. Furthermore, this product has no constipating effect when it is administered perorally over a long period of time to animals, this representing an important advantage over codein, the constipating action of which is well known. In addition to the properties indicated above, this product has a marked respiratory analeptic activity with doses of 5 to 10 mg. per kg. when it is administered intravenously.

The compound of Example V shows a powerful anti-tussive activity with few side-effects; it has also a diuretic and anti-inflammatory activity and shows ganglioplegic activity at a dose of about $\frac{1}{5}$ of its $LD_{50}$.

I claim:

1. A compound selected from the group consisting of an α-phenyl-β-(2-tetrahydrofuryl) propionitrile of the formula

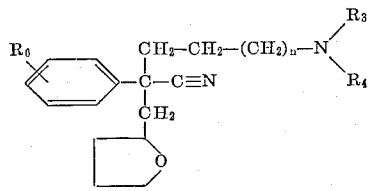

wherein:

$R_3$ and $R_4$ are members selected from the group consisting of lower alkyl and $R_3$ and $R_4$, together with the nitrogen atoms to which they are attached, form the piperidine ring and the morpholine ring;

$R_6$ is a member selected from the group consisting of hydrogen, lower alkoxy and phenoxy; and $n$ indicates the numerals 0 and 1, and their pharmaceutically acceptable in acid addition salts.

2. A compound selected from the group consisting of the α - phenyl - α-[2-(piperidino)ethyl]-β-(2-tetrahydrofuryl) propionitrile and its pharmaceutically acceptable acid addition salts.

3. A compound selected from the group consisting of an α-(4-lower alkoxy phenyl)-α-(2-di-lower alkylamino ethyl)-β-(2-tetrahydrofuryl) propionitrile and their pharmaceutically acceptable acid addition salts.

4. A compound selected from the group consisting of an α-(3-lower alkoxy phenyl)-α-(2-di-lower alkylamino ethyl)-β-(2-tetrahydrofuryl) propionitrile and their pharmaceutically acceptable acid addition salts.

5. A compound selected from the group consisting of α-(4-methoxy phenyl)-α-(2-dimethylamino ethyl)-β-(2-tetrahydrofuryl) propionitrile and its pharmaceutically acceptable acid addition salts.

6. A compound selected from the group consisting of α-(4 - methoxy phenyl)-α-[2-(piperidino)ethyl]-β-(2-tetrahydrofuryl) propionitrile and its pharmaceutically acceptable acid addition salts.

7. A compound selected from the group consisting of α - (4 - ethoxy phenyl)-α-(2-dimethylamino ethyl)-β-(2-tetrahydrofuryl) propionitrile and its pharmaceutically acceptable acid addition salts.

8. A compound selected from the group consisting of α-(3-methoxy phenyl)-α-(2-dimethylamino ethyl)-β-(2-tetrahydrofuryl) propionitrile and its pharmaceutically acceptable acid addition salts.

(References on following page)

References Cited by the Examiner

UNITED STATES PATENTS 1,915,334  6/1933  Salzberg et al. _____ 260—243
2,075,359  3/1937  Salzberg et al. _____ 167—22
2,362,614  11/1944 Calva _____ 167—22

ALEX MAZEL, *Primary Examiner.*
HENRY R. JILES, *Examiner.*
J. TOVAR, *Assistant Examiner.*